Figure 1:
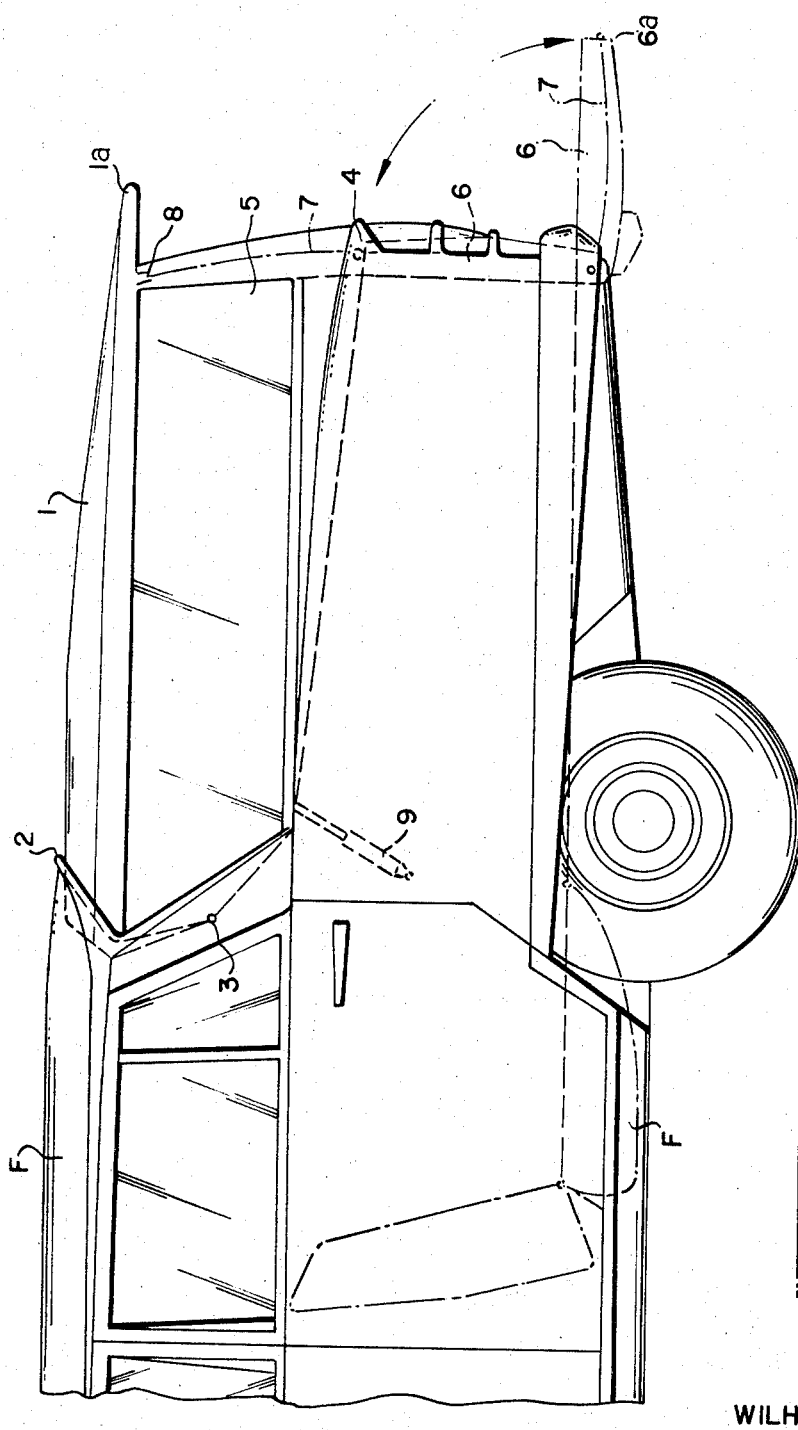

INVENTOR.
WILHELM WINGEN

INVENTOR.
WILHELM WINGEN
BY
AGENT

United States Patent Office 3,378,298
Patented Apr. 16, 1968

3,378,298
TAIL PORTION OF A MOTOR VEHICLE
Wilhelm Wingen, Munich, Germany, assignor to Georg Fritzmeier KG, Munich, Germany
Filed Feb. 14, 1966, Ser. No. 527,156
Claims priority, application Austria, Feb. 15, 1965, A 1,296/65
2 Claims. (Cl. 296—99)

The invention relates to the tail portion of a closed motor vehicle, such as a car or cabin cruiser, which has a baggage compartment in the rear.

It is the primary object of the invention to increase the size of such a baggage compartment while retaining the vehicle profile of a car designed for transporting persons only.

Prior attempts of combining the increased carrying capacity of station wagons with the appearance of a sedan have met buyers' resistance because of the overall profile of such vehicles still was that of a "business" rather than a "private" car so that they could not be sold to drivers concerned with the looks of a car.

The tail portion of a car or motor boat constructed in accordance with the present invention retains the profile lines of an elegant private vehicle while making it possible, in case of need, to increase the size of the carrying capacity merely by pivoting a specially designed rear roof structure.

It is known to provide the chassis of cars with adjustable rear roof, side and back walls so that the car may be converted to a station wagon but the proposed structures are very complex and the conversion takes much time. According to this invention, on the other hand, this problem is solved very simply and the conversion is readily accomplished.

For closing a rear opening in the vehicle, when the pivotal roof structure of the invention is lifted into a first position, use is made of a conventional structure wherein a rear window is mounted in a rear wall of the baggage compartment for upward movement beyond the upper edge of the rear wall. In this manner, the enlarged baggage compartment may be tightly closed in this first position.

The pivotal roof structure for the baggage compartment according to the invention includes a second rear window extending from the rear edge of the motor vehicle roof to the upper edge of the rear wall of the compartment, and two side windows movable into and out of vertical channels in the baggage compartment. Pivoting means is provided for moving the roof structure about a horizontally extending fulcrum axis into the first position wherein the second rear window extends substantially along the line of the motor vehicle roof, and the side windows of the roof structure extend upwardly from the side walls, and a second position wherein the second rear window extends downwardly from the rear edge of the motor vehicle roof to the upper edge of the rear wall, and the side windows extend into the vertical channels of the baggage compartment.

Figure 2:
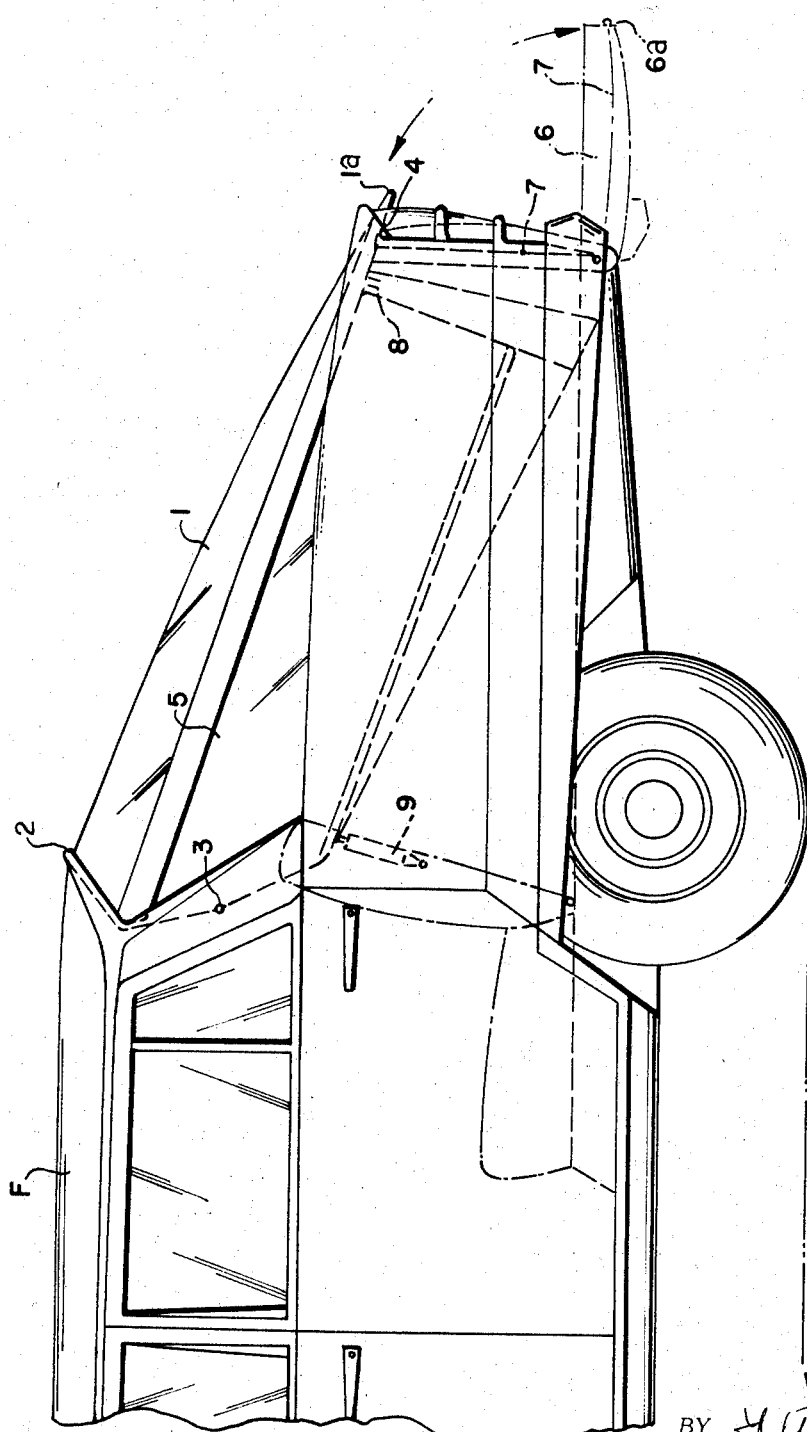

The accompanying drawing illustrates an embodiment of the tail portion applied to a motor car. In the drawing:

FIG. 1 shows the first position of the pivotal roof structure of the tail portion in side view, and FIG. 2 is a like view showing the second position wherein the roof structure has been lowered to convert the sedan into a station wagon.

Referring now to the drawing, the tail portion of a motor car F having a roof with a rear edge 2 is shown to comprise two side walls and a rear wall 6 defining a baggage compartment extending backwardly of the rear edge of the roof to the rear wall. The rear wall is a conventional rear door used in station wagons and pivotal about a horizontal fulcrum axis for gaining access to the baggage compartment, the rear door having an upper edge 6a and a rear window 7 being mounted therein for upward movement beyond the rear door upper edge.

The pivotal roof structure for the baggage compartment includes a second rear window 1 extending from rear edge 2 of the motor vehicle roof to the upper edge 6a of the rear door. As illustrated, the pane of large window 1 is preferably slightly curved to provide a streamlined appearance in the second position of the roof structure (FIG. 2). Two side windows 5, 5 extend downwardly from window 1 and are movable into and out of vertical channels in the baggage compartment.

The pivoting means for the roof structure is shown to include, by way of example, a hydraulic motor 9 actuating a linkage system including a horizontally extending fulcrum axis 3 about which the hydraulic motor may pivot the roof structure. Obviously, the hydraulic motor may be replaced by pneumatic or electrical motor means which, if desired, may be controlled from the driver's seat.

The location of fulcrum axis 3 is so chosen that the front edge of rear window 1 will be in sealing engagement with the rear edge 2 of the vehicle roof in all angular positions of the pivotal roof structure. Similarly, the side windows 5, 5 are sealed by gaskets in the chassis in a known manner when the side windows are lowered into the channels in the baggage compartment. Jamming due to icing or accumulation of dirt may be prevented by positioning side windows 5, 5 slightly obliquely, as indicated in FIG. 1.

The rear rim of window 1 rests sealingly against the upper edge 6a of the rear door in the second position of the pivotal roof structure (FIG. 2). The extension 1a of the window 1 beyond the upper edge of the rear door provides turbulence at normal driving speeds, which largely prevents accumulation of dirt or snow at the point where the window rests on the upper door edge.

The rear window 7 is mounted in the rear door 6 for upward movement in a well known manner. Upward movement of this rear window may be manually controlled or be automatically effected from the driver's seat. In the first position of the pivotal roof structure (FIG. 1), the rear window 7 is moved upwardly to close the rear opening of the baggage compartment created by the upward pivoting of the roof structure. To obtain a tight seal, the pivotal roof structure includes a channelled frame 8 which engages the upwardly moved rear window 7.

As will be seen from FIG. 2, the profile of the tail portion of a conventional sedan is not changed by the pivotal roof structure of this invention, when the same is in a second position while, in a first position, the roof structure may be lifted so as to enlarge the baggage compartment considerably while still being fully sealed. FIG. 2 thus illustrates the car in its conventional appearance as a sedan while FIG. 1 shows it converted to the looks of a station wagon, with its increased carrying capacity.

Thus, the present invention makes it possible to change a conventional-looking sedan to increase its carrying capacity merely by lifting a special roof structure and raising the rear window while keeping the compartment sealed. This structure is equally useful for motor boats or cabin cruisers.

I claim:
1. The tail portion of a motor vehicle having a roof with a rear edge, the tail portion comprising
   (1) two side walls and a rear wall defining a baggage compartment extending backwardly of the rear edge of the roof to said rear wall, the rear wall having an upper edge,
   (2) a first rear window mounted in the rear wall for upward movement beyond said upper edge,

(3) a pivotal roof structure for the baggage compartment, said roof structure including
 (a) a second rear window extending from the rear edge of the motor vehicle roof to the upper edge of the rear wall, and
 (b) two side windows movable into and out of vertical channels in the baggage compartment.
(4) a horizontally extending fulcrum axis from the pivotal roof structure, and
(5) pivoting means for moving the pivotal roof structure about said fulcrum axis into a first position wherein the second rear window of the roof structure extends substantially along the line of the motor vehicle roof and the side windows of the roof structure extend upwardly from the side walls, and a second position wherein the second rear window extends downwardly from the rear edge of the motor vehicle roof to the upper edge of the rear wall and the side windows extend into said vertical channels.

2. The tail portion of claim 1, wherein the second rear window of the pivotal roof structure extends beyond the upper edge of the rear wall.

References Cited

UNITED STATES PATENTS 1,952,818   3/1934   Newton _____ 296—99

LEO FRIAGLIA, *Primary Examiner.*

P. GOODMAN, *Assistant Examiner.*